(12) United States Patent
Okamoto

(10) Patent No.: US 7,162,313 B2
(45) Date of Patent: Jan. 9, 2007

(54) ELECTRONIC EQUIPMENT OPERATING COMPONENT FUNCTION SETTING SYSTEM

(75) Inventor: Hiroshi Okamoto, Tokyo (JP)

(73) Assignee: Westwood Co., Ltd., Tokyo (JP)

( * ) Notice: Subject to any disclaimer, the term of this patent is extended or adjusted under 35 U.S.C. 154(b) by 416 days.

(21) Appl. No.: 10/807,706

(22) Filed: Mar. 24, 2004

(65) Prior Publication Data

US 2004/0180704 A1 Sep. 16, 2004

Related U.S. Application Data

(63) Continuation of application No. 09/818,362, filed on Mar. 26, 2001, now Pat. No. 6,754,544.

(30) Foreign Application Priority Data

Mar. 27, 2000 (JP) .............................. 2000-086529

(51) Int. Cl.
*G05B 15/00* (2006.01)
*G06F 9/455* (2006.01)
(52) U.S. Cl. ......................................... 700/83; 703/27
(58) Field of Classification Search ................. 700/83, 700/95, 84; 345/970; 703/27, 20
See application file for complete search history.

(56) References Cited

U.S. PATENT DOCUMENTS

| | | | | |
|---|---|---|---|---|
| 4,896,370 A | * | 1/1990 | Kasparian et al. | ............ 455/77 |
| 5,297,053 A | * | 3/1994 | Pease et al. | ................. 700/182 |
| 5,437,044 A | * | 7/1995 | Hohner et al. | ................. 710/72 |
| 5,911,121 A | * | 6/1999 | Andrews | ..................... 455/418 |
| 6,097,991 A | * | 8/2000 | Hamel et al. | .................. 700/95 |
| 6,272,584 B1 | * | 8/2001 | Stancil | ....................... 710/241 |
| 6,385,739 B1 | * | 5/2002 | Barton et al. | ................. 714/25 |

* cited by examiner

*Primary Examiner*—Thomas Pham
(74) *Attorney, Agent, or Firm*—Fulwider Patton LLP

(57) ABSTRACT

In a system for function settings of operating components in a piece of electronic equipment, a microcomputer circuit (4) of a radio receiver outputs function control signals to a radio receiver circuit (2), based on operating input signals. An input-output port correspondence setting program is downloaded from an external personal computer (8) to the microcomputer circuit (4), this program displaying a correspondence guide screen on a display of the external personal computer (8) and generating control function assignment data between groups of operating components (31*a*, 31*b*), (32*a* to 32*c*), and (33*a* to 33*c* and 34*a* to 34*c*) having the same type and characteristics. This data is transferred to the microcomputer circuit (4), so that the microcomputer circuit (4) sets the relationships of correspondence between the input and output ports (4*d*) and (4*e*), based on the input-output port correspondence setting program.

8 Claims, 4 Drawing Sheets

ELECTRONIC EQUIPMENT OPERATING COMPONENT FUNCTION SETTING SYSTEM

This is a continuation of U.S. patent application Ser. No. 09/818,362, filed Mar. 26, 2001, now U.S. Pat. No. 6,754,544, entitled ELECTRONIC EQUIPMENT OPERATING COMPONENT FUNCTION SETTING SYSTEM, which is hereby incorporated by reference in its entirety.

BACKGROUND OF INVENTION

1. Field of the Invention

The present invention relates to an electronic equipment operating component function setting system, as applied to various electronic equipment, such as radio equipment, in which a microcomputer circuit is used to control input and output of operating signals, this system selectively setting assignments of control functions for operating components, in accordance with the operator of the equipment and the particular installation location.

2. Related Art

Electronic equipment such as radio equipment has many operating components located on a front panel, the placement of which thereon is done with consideration given to the ease of operation when performing control of the associated functions. For example, the scheme usually followed in the case of radio equipment is that operating components for changing the frequency, which are often operated are placed on the right side, operating components for audio volume adjustment are placed on the left side, and switches used to change the mode or select a frequency band and squelch level adjusting components are located in the center.

There are a variety of methods of mounting operating components to a front panel, the general method employed being that of pre-assembling operating components to a panel board, and then mounting the panel board to the rear surface of the front panel, so that operating parts of the operating components protrude through or are exposed via holes formed in the front panel, with knobs mounted to protruding shafts that form the operating parts of operating components.

The configuration shown in FIG. 4 and FIG. 5 of the accompanying drawings is that of an example applied to a radio receiver, these drawings being an outer perspective view and an exploded view of the various constituent elements thereof.

In these drawings, the reference numeral 101 denotes a die-cast chassis, 102 is a PCB (printed circuit board), onto which is packaged an electronic circuit, 103 is a top cover, 104 is a bottom cover, 105 are operating components such as potentiometers, rotary encoders, and switches, 106 is a liquid-crystal display panel, 107 is a panel board, 108 is a front panel, 109 are knobs, and 110 is a transparent acrylic sheet, the radio receiver 100 being assembled by the following procedure.

First, the PCB 102 is mounted to the die-cast chassis 101 after the connector 102a is mounted to the PCB 102.

The panel board 107 also is formed by a PCB, the various operating components 105 being soldered or brazed into place with the operating parts thereof passing through the holes pre-formed in the panel board 107, the terminals of each being connected by soldering to the conductive pattern parts of the panel board 107, and the LCD panel being mounted to a window formed in the panel board 107.

A connector-terminated cable 107a is also connected to the panel board 107, thereby completing the overall panel board assembly 107b.

Next, holes and windows are formed also in the front panel 108 at positions corresponding to the holes and windows in the panel board 107, the panel board assembly 107b, to which are mounted the various parts 105, 106, and 107a, being mounted to the rear surface of the front panel 108, and the transparent acrylic sheet 110 being mounted to the window part formed at the front surface of the front panel 108.

Then, the entire front panel 108, to which is mounted the panel board assembly 107b, is mounted to the front surface of the die-cast chassis 101, after which the connector-terminated cable 107a of the panel board assembly 107b is connected to a connector 102a on the PCB 102, and, if there are connectors on the rear surface of the die-cast chassis 101, these are also connected to the PCB 102.

After the above is done, the top cover 103 and the bottom cover 104 are mounted to the die-cast chassis 101, and finally knobs 109 are pressed from the front side onto shafts of operating parts of the operating components 105 passing through holes in the front panel 108, thereby completing the assembly of the product (the radio receiver 100).

Recently, to simplify the assembly process, a bracket or the like, to which individual components are mounted, is fixed to the PCB 102, with the parts 105 and 106 being directly mounted to the PCB 102, along with the electronic circuit, so as to simplify the assembly process.

Although the layout of the operating components on the front panel as described above is done with the assumption of a right-handed operator, the operator of the radio equipment or the like is naturally not necessarily right-handed, and might have lost the use of the right hand for reason of some disability or injury, making operation extremely difficult.

Additionally, in mobile radio equipment installed in a vehicle, with restrictions in the installation location, there are cases in which fixing the location of operating components results in a worsening of ease of operation.

In view of the above-noted situation, although there is a significant need for placement of operating components to accommodate individual operating conditions, with the operating components 105 assembled to the panel board 107 as noted above, it is not possible to freely change the layout positions of the operating components 105 on the front panel 108. If an attempt is made to change the layout positions, it would be necessary to change the conductive path layout of the panel board 107 and the PCB 102 as well, the result being that only a made to order product could accommodate these changes, this product being highly costly.

In much recent electronic equipment, operating input signal are captured as digital information by a microcomputer circuit, which is caused to perform the prescribed control functions, so that operating components having the same attributes often have common specifications. In the case of the above-noted example of a radio receiver, rotary encoders are used to change the frequency or adjust audio volume, pushbutton switches are used to perform mode and band switching, and potentiometers are used for squelch level adjustments and the like, and if operating components with common specifications are used for these functions, parts procurement is facilitated, enabling purchase of a smaller number of parts having the same specifications at one time, thereby providing a reduction in the cost of parts.

Accordingly, it is an object of the present invention, in view of the above-noted problems, to provide a system for programmably assigning control functions to each operating component, thereby enabling selective placement of operating components for the function controls of a piece of electronic equipment, so as to achieve good ease of operation, adapted to the operation conditions of the equipment at all times.

SUMMARY OF THE INVENTION

The present invention is a system for function settings of operating components in a piece of electronic equipment having a circuit configuration wherein an internal microcomputer circuit outputs control signals for functions to be controlled, based on input signals input from each operating component, and which includes groups of operating components of the same type and characteristics. In this system, a connector is provided for making connection between an external computer and the microcomputer circuit, the connection condition therebetween establishing whether a program for making settings of correspondence between input and output ports is to be downloaded from the external computer to the microcomputer circuit, or whether the above-noted program has been previously stored in the above-noted microcomputer circuit, with data that establishes a correspondence between input and output ports of the microcomputer being transferred from the external computer, so that the microcomputer circuit, based on this program, executes the establishment of settings of correspondence between input ports associated with groups of operating components of the same type and characteristics and output ports associated with functions that are to be controlled.

According to the present invention, a microcomputer circuit performs control of the output of control signals with respect to functions that are to be controlled, responsive to operating inputs in the electronic equipment, the setting of correspondences between input and output ports of the microcomputer circuit being selectively executable from the external computer. It is therefore possible to freely establish functional assignments between operating components of the same type and characteristics, thereby enabling the achievement of functional operating component placement adapted to the usage conditions of the electronic equipment.

In the present invention, data that establishes correspondences between input and output ports of a microcomputer circuit is transferred from an external computer, and it is alternately possible to generate this data using the external computer, in which case the display of the external computer displays a layout screen showing the operating component of the electronic equipment, with position information added at the display positions of each of the operating components and a table, in which there is a correspondence set up between the position information of each group of operating components of the same type and characteristics and functional information icons of the functions to be controlled that can be assigned to these operating component groups, the function information icons of this table being dragged and dropped onto display positions of operating components in the layout screen, in an object-oriented type of assignment operation, which facilitates the intuitive generation of the correspondence data.

If the program for setting the input-output port correspondences is provided stored in a recording medium that can be read by the electronic equipment and the external computer, it is possible for the purchaser of the electronic equipment to freely initialize the layout of functional operating components associated with the electronic equipment.

BRIEF DESCRIPTION OF THE DRAWINGS

The above and other features of the present invention will be better understood by reading the description of exemplary embodiments to follow, making reference to the accompanying drawings, of which.

DETAILED DESCRIPTION OF THE PREFERRED EMBODIMENTS

Embodiments of a system for functional setting of operating components in electronic equipment according to the present invention are described in detail below, with references made to FIG. 1 through FIG. 3.

Figure 1:
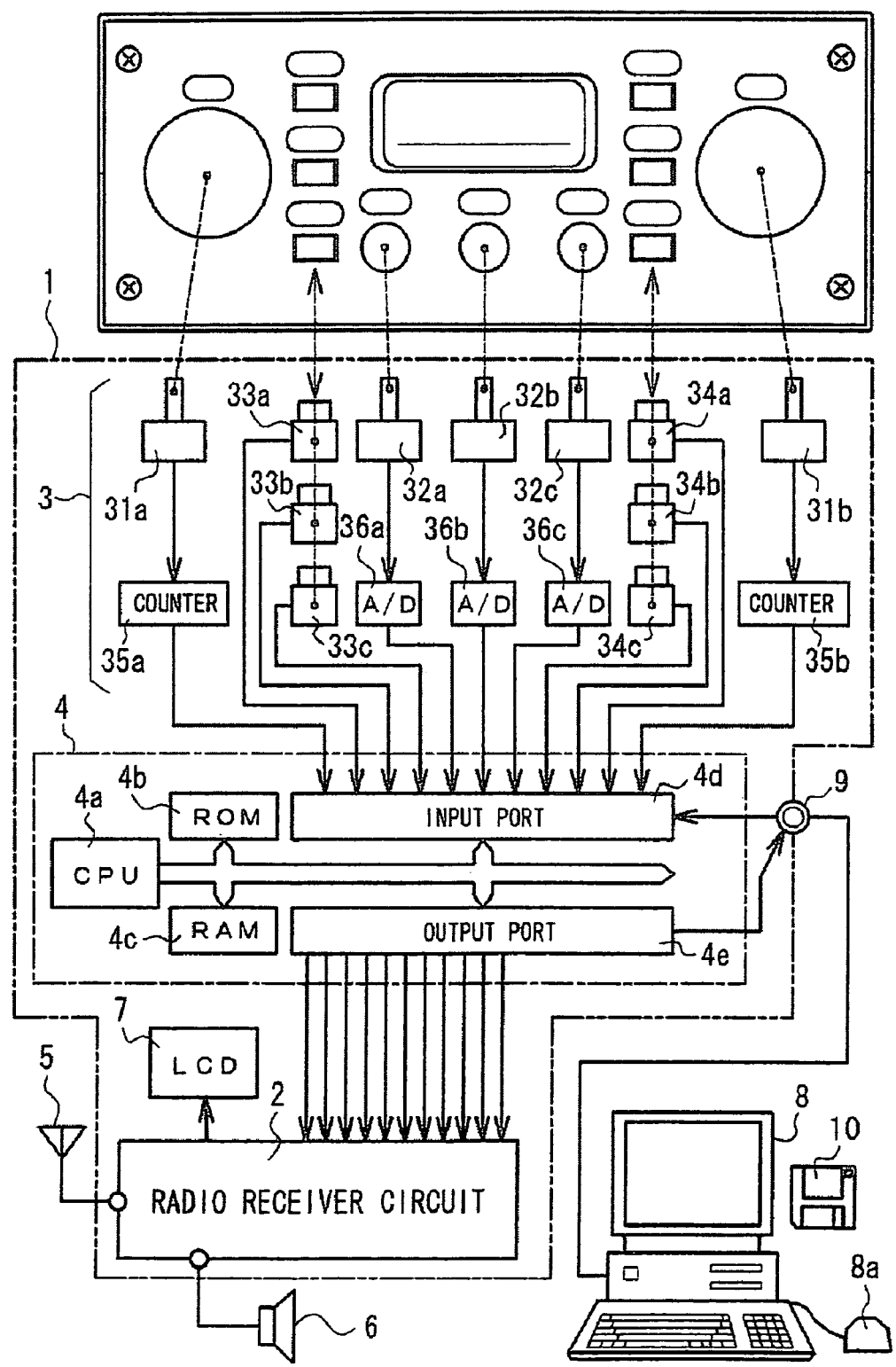
FIG. 1 is a drawing showing placement of operating components on the front panel of a radio receiver and an associated system circuit diagram.
Figure 2:
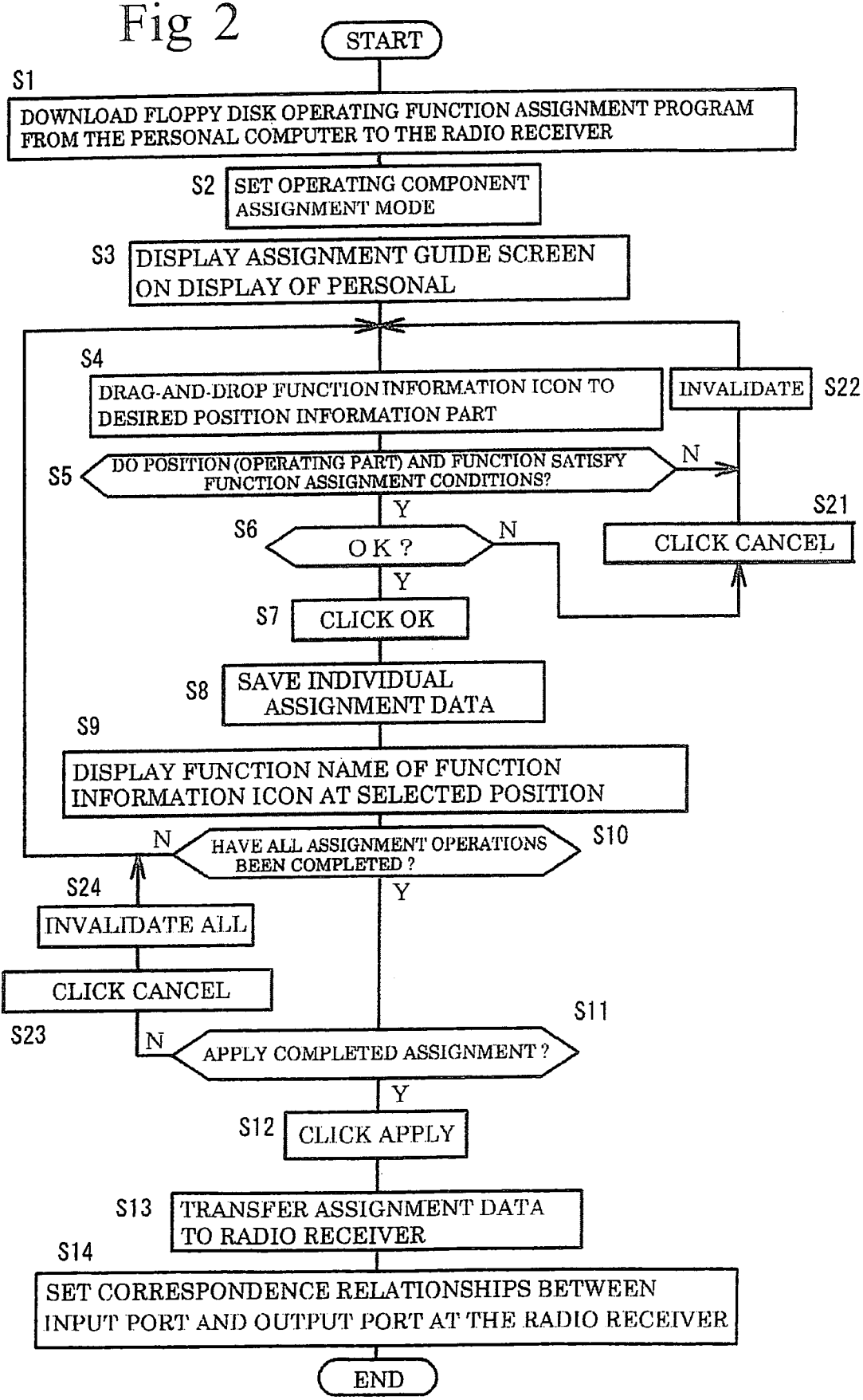
FIG. 2 is a flowchart showing the procedure for functional assignments of each operating component of a radio receiver.

Specifically, FIG. 1 is a drawing showing placement of operating components on the front panel of a radio receiver and an associated system circuit diagram, the system circuit diagram showing various operating components and the correspondence of these components to placement positions of parts on the front panel.

FIG. 1 also shows the connection of a personal computer (PC) to the above-noted radio receiver.

In this drawing, the main part of the system circuitry 1 is formed by a radio receiver circuit 2, an operating part 3, and a microcomputer 4, the radio receiver circuit 2 being connected to an antenna 5 and a speaker 6, and further having an output circuit with respect to a liquid-crystal display 7.

In this system circuit 1, the microcomputer 4 captures various operating signal from the operating component groups 3, and outputs prescribed control signals to the various function control terminals of the radio receiver circuit 2, in response to operations.

The radio receiver has a connector 9 for connection to the external personal computer 8, and it is possible to make a connection between the personal computer 8 and the microcomputer circuit 4 via this connector 9.

The above-noted operating component groups 3 are formed by two rotary encoders 31a and 31b, three potentiometers 32a, 32b, and 32c, and six pushbutton switches 33a, 33b, 33c, 34a, 34b, and 34c.

Digital signals responsive to the amount of operation of operating components are input to the microcomputer circuit 4 via counters 35a and 35b for the rotary encoders 31a and 31b, and via A/D converters 36a to 36c for the potentiometers 32a to 32c, and on/off signals for the pushbutton switches 33a to 33c and 34a to 34c are also input to the microcomputer circuit 4.

The above-noted groups of same-type operating components are each made up of parts having the same specifications. For example, in the case of the rotary encoders 31a and 31b, both have the same characteristics in terms of the required resolving power in terms of a unit angle or with regard to one revolution, and in the case of the potentiometers 32a to 32c, the characteristics are the same, in terms of the range of variable resistance.

While operating components also include a power switch and the like, these are not illustrated, as they are not that significant for the purpose of describing the features of this embodiment of the present invention.

The microcomputer circuit is usually formed by a CPU 4a, a ROM 4b, a RAM 4c, an input port 4d, and an output port 4e, which are connected via a bus. As noted above, operating signal input lines of the various operating components of the operating part 3 are connected to the input port 4d, and control signal output lines for the radio receiver circuit 2 are connected to the output port 4e, the input and output ports 4d and 4e being connected to the personal computer via the connector 9.

Based on the above-described system configuration, the function setting system for operating components in this embodiment is described below, with reference made to the flowchart of FIG. 2.

First, when the above-noted radio receiver is shipped from the factory, the control functions for each operating component are not assigned. Instead, a floppy disk 10 and instruction manual, which includes a description of the function settings, are packaged with the radio receiver, enabling the user to make control function assignments to the various operating components.

Before using the radio receiver, the user makes a connection between the radio receiver and the personal computer 8 via the connector 9, and inserts the floppy disk 10 into the personal computer 8.

At this point, the floppy disk 10 has stored on it an operating function assignment program for the operating components, enabling the downloading of this program to the radio receiver by performing a prescribed operation at the personal computer 8 (step S1).

Figure 3:
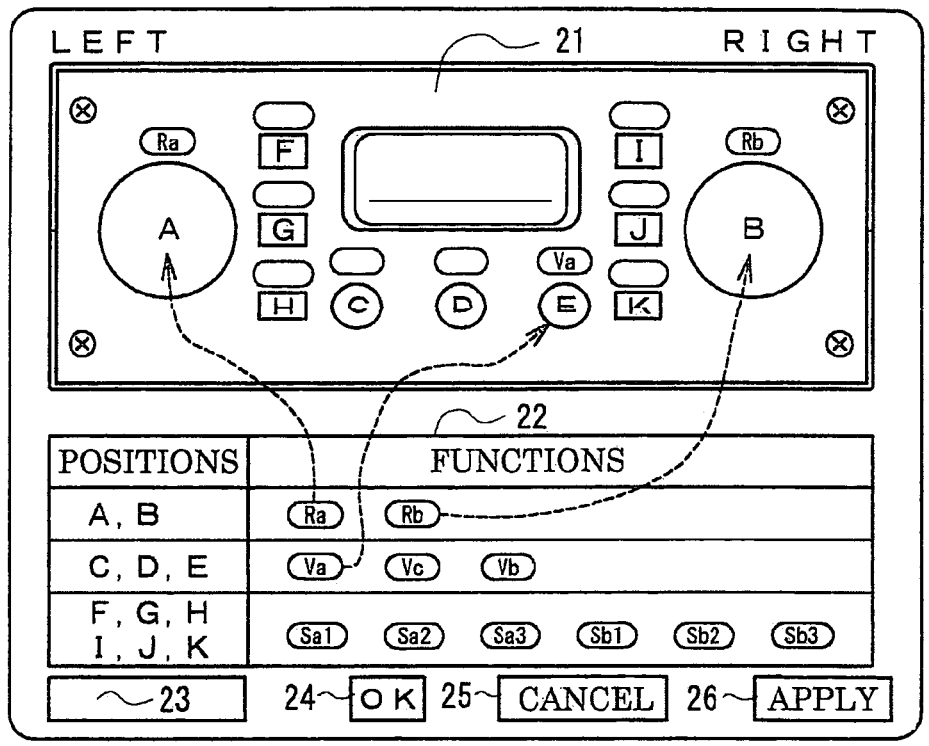
FIG. 3 is a drawing showing the assignment guide screen displayed on the display of a personal computer.
Figure 4:
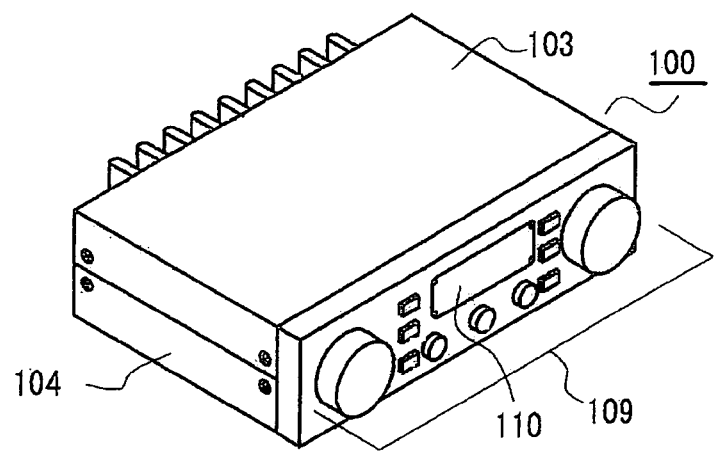
FIG. 4 is an outer perspective view of a radio receiver.
Figure 5:
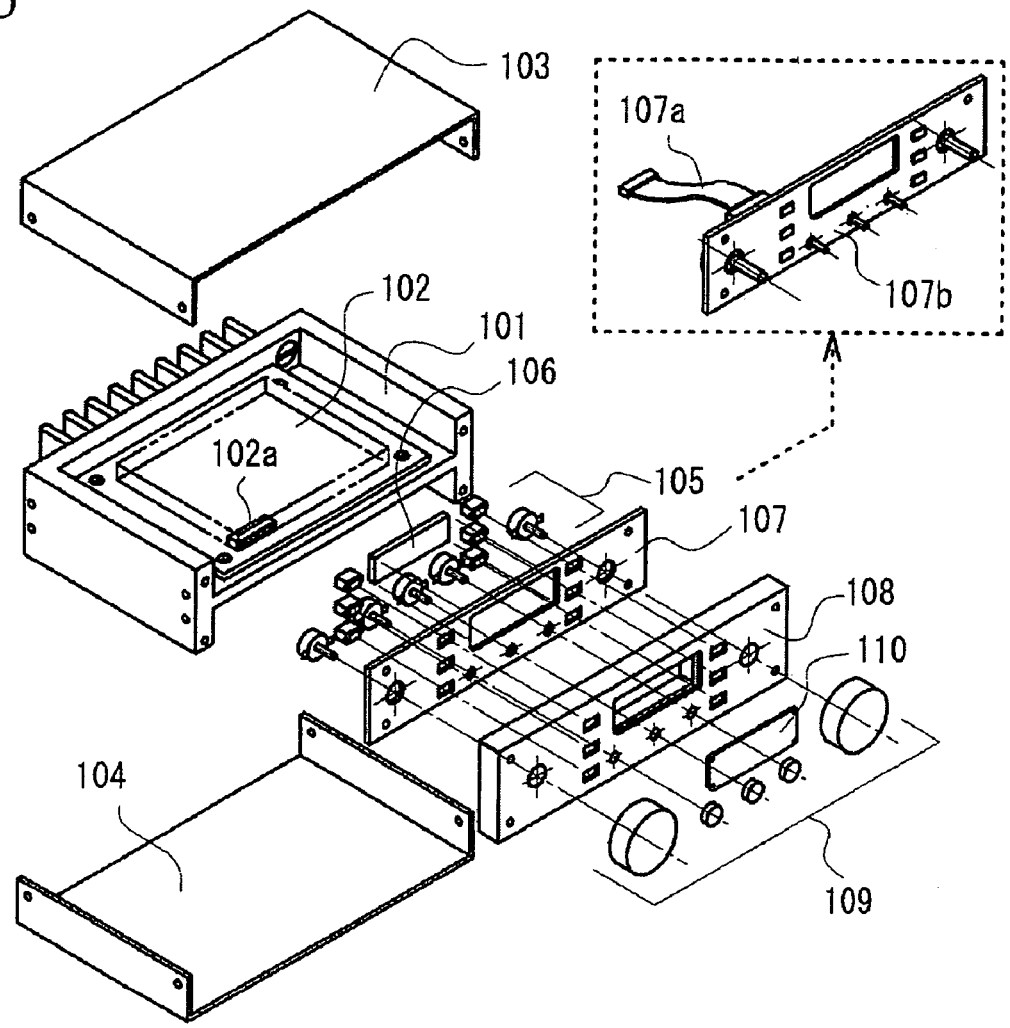
FIG. 5 is an exploded perspective view showing constituent elements of a radio receiver.

By performing this downloading operation, both the radio receiver and the personal computer 8 are placed in the function assignment mode, and the display of the personal computer 8 displays an assignment guide screen, as shown in FIG. 3 (steps S2 and S3). This assignment guide screen provides the following information.

The upper area of the screen shows a layout drawing 21 indicating the part groups of the operating components 3 on the front panel of the radio receiver and the position information A to K at the display positions of the various operating components, with a blank function indictor located above the display positions of each operating component.

The lower area of the screen displays a correspondence table 22, which indicates the position information A to K, and function information icons that can be assigned to operating components at each of the positions.

Although these function information icons are indicated in simplified form in FIG. 3, the actual display shows the function names, such as frequency change for [Ra], audio volume for [Rb], squelch level adjustment for [Va], shift adjustment for [Vb], width adjustment for [Vc], and mode switching or bandwidth switching for [S1a] to [Sb3].

With the operating components for the position information A and B corresponding to rotary encoders, the operating components for the position information C to E corresponding to potentiometers, and the operating components for the position information F to K corresponding to pushbutton switches, because of the restriction with regard to the assignable functions for each of these operating component groups, it is possible to assign only [Ra] and [Rb] to position information A and B, to assign only [Va], [Vb], and [Vc] to position information C, D, and E, and only [S1a] to [Sb3] to position information F to K, these restrictions being indicated by assignment to different lines of the correspondence table 22.

The lowermost part of the screen has an operational guidance field 23 for the function assignment mode, and buttons 24, 25, and 26, which serve as OK, Cancel, and Apply buttons.

Next, returning to FIG. 2, the user follows the above-described assignment guide screen while selecting function information icons with a mouse 8a of the personal computer 8, so as to drag and drop the function information icons on desired position information parts (operating component positions) (step S4). When this is done, the personal computer 8 verifies whether a dragged and dropped function information icon can be dropped onto to the selected position information, and if dropping is allowed, displays the prompt message "OK?" in the operating guidance field 23 of the display. If the OK button 24 is clicked at this point, the individual assignment data specified by the drag-and-drop operation is saved into an internal memory (steps S5 to S8).

Function names of the function information icons selected based on the assignment data established in the above-noted manner are displayed on the function display part in correspondence to the selected position information (step S9).

In the case in which a drag-and-drop operation is attempted at step S5 but the assignment is not possible, if rather than clicking the OK button 24 the Cancel button 25 is clicked at step S6 to request cancellation of the setting, the data of the drag-and-drop operation is invalidated, and a message prompting a retry of the operation is displayed in the operation guidance field 23 (step S5 jumping to step S22 and step S6 jumping to steps S21 and S22).

By repeating the drag-and-drop operations to drag and drop each function information icon to an operating component part at a desired position information, assignment data established by these operations are successively saved in to the internal memory of the personal computer 8, as the function names of the function information icons are sequentially displayed at the function display parts of the selected position information (steps S4 to S10, and return to step S4).

The broken lines and arrows shown in FIG. 3 indicate the condition of making selective assignments of the function information icons [Ra], [Rb], and [Vc] to operating components corresponding to the position information A, B, and E.

When all the assignments are completed by the process of the above-noted drag-and-drop operations, a message appears in the operating guidance field 23 to ask the user whether the completed assignments are to be set, at which point the users checks the layout screen 21 once again, and, if the layout is acceptable, clicks the Apply button 26 to indicate that the settings are to be applied (steps S11 and S12).

If there is an error in the completed condition of the layout screen 21, making it necessary to make a correction, the user clicks the Cancel button 25, thereby clearing all the data, at which point it is possible to redo all the assignments (step S11 jumping to step S23 and step S24 jumping to step S4).

If the Apply button 26 is clicked, the assignment data after completion of the above-noted operations is set as data by the personal computer 8 and transferred to the radio receiver (step S13).

Upon receiving this assignment data, the microcomputer circuit 4 of the radio receiver launches the operating function assignment program downloaded thereto at step S1, so as to set the relationship of correspondence between its input port 4*d* and the output port 3*e*, in accordance with the above-noted assignment data (step S14).

More specifically, for example, in the case in which, as shown in FIG. 3, if the function information icons [Ra], [Rb], and [Vc] are respectively assigned to the operating components associated with the position information A, B, and E, the input-output relationships are set up in FIG. 1 so that the signal input port of the input ports 4*d* associated with the rotary encoder 31*a* is connected to the signal output port of the output ports 4*e* connected of to the frequency conversion terminal of the receiver circuit, the signal input port of the input ports 4*d* associated with the rotary encoder 31*b* is connected to the signal output port of the output ports 4*e* connected to the audio volume adjustment terminal of the receiver circuit, and the signal input port of the input ports 4*d* associated with potentiometer 32*c* is connected to the signal output port of the output ports 4*e* connected to the squelch level adjustment terminal of the receiver circuit, with the input and output ports for other signals being assigned settings in accordance with the assignment data.

That is, in this embodiment the control function assignments of the operating components 3*a*, 31*b*, 32*a*, 32*b*, 32*c*, 33*a*, 33*b*, 33*c*, 34*a*, 34*b*, and 34*c* of the radio receiver can be programmably executed from the personal computer 8, so that function settings can be freely made mutually between the operating component groups (31*a*, 31*b*), (32*a* to 32*c*), and (33*a* to 33*c*, 34*a* to 34*c*) of operating components of the same type and characteristics.

It is therefore possible to easily achieve a layout of function operating components that provides the optimum ease of operation in accordance with the dominant hand of the user, or requirements imposed because of impaired hand use of the user, or because of restrictions imposed by the installation location of the radio receiver.

In general, the knobs and exposed parts of operating components on the front panel have function or scale markings nearby these parts. In this embodiment, however, because the functions of the operating component groups (3*a*, 31*b*), (32*a* to 32*c*), and (33*a* to 33*c*, 34*a* to 34*c*) are selectively assigned in accordance with usage conditions, the use of front panel functional markings, as done in the past, is not practical.

With regard to this problem, it is possible to pre-fabricate printed or embossed seals or plates with function names thereon, and to affix these seals or plates in accordance with the layout of the operating components for the various functions, thereby providing a marking of the functions of the respective knobs and switches.

In this case, it is possible to refer to the layout screen 21 displayed on the personal computer 8 display or to a printout therefrom after the establishment of the assignments when applying the seals or plates in accordance with the function names shown at the function indication parts.

Although this embodiment is described for the case in which absolutely no functions are assigned to the operating components at the time the radio receiver is shipped from the factory, it will be understood that it is alternately possible to provide a radio receiver with standard function assignments (for example, assignments that assume a right-handed user), and to enable the user to follow the above-noted procedure so as to overwrite the standardly provided assignments.

Additionally, although in this embodiment the operating function assignment program is downloaded from the personal computer 8 to the radio receiver, it will be understood that it is alternately possible to have this program be a process control program that establishes correspondences between the input and output ports 4*d* and 4*e*, based on the assignment data, thereby eliminating the need to provide the external personal computer 8, this being stored beforehand in the ROM 4*b* of the microcomputer circuit of the radio receiver, so that only the assignment guide screen data and the operating procedure program and data transfer program are provided on the floppy disk 8*a*, the data transfer causing automatic launching of the operating function assignment program by the microcomputer circuit 4.

Additionally, although in this embodiment the system configuration has a dedicated microcomputer circuit 4 to control input and output of the operating signals, in the case in which a microcomputer circuit is provided to control the overall system, if the microcomputer circuit has a sufficient number of ports and processing capacity, this microcomputer circuit can be used, the procedure of this embodiment being executable by that microcomputer circuit.

By adopting the above-noted constitution, an electronic equipment operating component function setting system according to the present invention achieves an number of effects.

The subject invention is used in electronic equipment having a configuration in which a microcomputer circuit outputs control signals for controlling functions, based on input signals from various operating components, this electronic equipment having groups of operating components of the same type and characteristics, to enable programmable setting of the functional assignments between operating components of the same type and characteristics, thereby enabling easy placement of function operating components that adapts to usage conditions of the electronic equipment, such as the need to accommodate the dominant hand of a user, or to accommodate restrictions imposed by the need to provide easy operation for a disabled user or the need to accommodate a particular installation location for the radio receiver.

The subject invention also enables execution of the function assignment operation recited in claim 1 of the accompanying claims using an object-oriented procedure to provide the user with a visual presentation during setting, thereby facilitating the intuitive generation of correspondence data.

The subject invention, taking advantage of the widespread use of personal computers, further enables the user to make functional assignments of operating components of a piece of electronic equipment from a personal computer.

While several forms of the present invention have been illustrated and described, it will also be apparent that various modifications may be made without departing from the spirit and scope of the invention. Furthermore, while the preferred embodiment of the invention has been described in terms of the dimensions and cross-sectional configurations of various components of the invention it is understood that the invention is not intended to be limited to those specific dimensions or configurations but is to be accorded the full breadth and scope of the claims appended hereto.

What is claimed is:

1. A radio control device comprising:
   a first set of input mechanisms each having similar characteristics and located on the radio control device, said first set of input mechanisms initially undefined with respect to operational functions of the radio control device;
   means for assigning operational functions of a first type to each of the first set of input mechanisms;
   a second set of input mechanisms each having similar characteristics that differ from said first set of input mechanisms, and located on the radio control device, said second set of input mechanisms initially undefined with respect to operational functions of the radio control device;

means for assigning operational functions of a second type to each of the second set of input mechanisms; and an electronic display for indicating the assigned operational function given to each of the input mechanisms.

2. The radio control device of claim 1 wherein the first set of input mechanisms and second set of input mechanisms are selected from the group including rotary encoders, push button switches, and potentiometers.

3. The radio control device of claim 1 wherein the operational functions are selected from the group including frequency adjustment, volume adjustment, squelch adjustment, and bandwidth adjustment.

4. A radio control device comprising:

a plurality of interchangeable input mechanisms, each input mechanism assignable by a user to a radio control operational function selected from among a set of radio control operational functions, the radio control device further comprising a data port for receiving instructions from an external computer and a controller for coordinating the input mechanisms with their respective assigned radio control operational function, where said assignments of each radio control operational function by the user are first performed on an external computer, and then such assignments are converted into instructions for the controller and communicated by the external computer to the controller of the radio control device via the data port.

5. The radio control device of claim 4 wherein the interchangeable input mechanisms are located in pairs, and each input mechanism of said pairs are located on respective right and left hand sides of the radio controlled device.

6. The radio control device of claim 4 wherein the interchangeable input mechanisms are selected from the group comprising rotary encoders, push button switches, and potentiometers.

7. The radio control device of claim 4 wherein the plurality of interchangeable input mechanisms are subdivided into first and second input mechanism types, a first input mechanism type assignable to radio control operational functions of a first group, and a second input mechanism type assignable to radio control operational functions of a second group, where there is no radio control operational function common to both the first group and the second group.

8. A hand held radio control device comprising:

an antenna;

a microcomputer;

a transmitter;

a plurality of command input devices used for wireless remote control of a remote device;

a data link connecting the hand held radio control device's microcomputer with an external computer; and means for reassigning functions of said command input devices using said data link.

* * * * *